United States Patent [19]
Buckman et al.

[11] 3,859,322
[45] Jan. 7, 1975

[54] NOVEL HYDROXY SUBSTITUTED ESTERS OF THIOLSULFONIC ACIDS AND THEIR USE AS MICROBICIDES

[75] Inventors: John D. Buckman; John D. Pera; Fred W. Raths, all of Memphis, Tenn.

[73] Assignee: Buckman Laboratories, Inc., Memphis, Tenn.

[22] Filed: July 26, 1973

[21] Appl. No.: 383,012

Related U.S. Application Data

[63] Continuation of Ser. No. 862,030, Sept. 29, 1969, abandoned.

[52] U.S. Cl. .............................. 260/453 R, 424/303
[51] Int. Cl. .................... C07c 143/10, C07c 143/06
[58] Field of Search ................................ 260/453 R

[56] References Cited
UNITED STATES PATENTS
2,484,370 10/1949 Ballard et al.................... 260/348 R
3,534,126 10/1970 Moore .............................. 424/303

OTHER PUBLICATIONS
Ross, "The Reactions of Certain Epoxides in Aqueous Solids," (1950), J. Chem. Soc., 1950, pp. 2257–2272.
Nylen et al., "Thiol Acids Added to Ethylene Oxide," (1941), CA36, p. 753, (1942).

*Primary Examiner*—Glennon H. Hollrah
*Attorney, Agent, or Firm*—Floyd E. Trimble

[57] ABSTRACT

The new compounds 2-hydroxyalkyl esters of thiosulfonic acids which are useful as microbicides and methods of preparing the same are described.

4 Claims, No Drawings

NOVEL HYDROXY SUBSTITUTED ESTERS OF THIOLSULFONIC ACIDS AND THEIR USE AS MICROBICIDES

This application is a continuation of co-pending U.S. application Ser. No. 862,030 filed Sept. 29, 1969, and now abandoned.

This invention relates to novel 2-hydroxyalkyl esters, their preparation, and their use as microbicides. More particularly, the products of this invention are useful for the control of slime-forming and other microorganisms in industrial processes involving water and substances that are normally susceptible to microbiological degradation or deterioration in the presence of water, in which the growth and proliferation of such microorganisms interfere in the process itself or affect the quality or character of the resulting product.

Many industrial products when wet or when subjected to treatment in water are normally susceptible to microbial degradation or deterioration if means are not taken to inhibit such degradation or deterioration. Wood pulp, wood chips, starch and proteinaceous substances, animal hides, vegetable tanning liquors, and leather are all damaged or degraded by growth of microorganisms or by enzymes produced by such growth.

An objectionable phenomenon occurring in industrial process systsms involving water is slime formation. Slime consists of matted deposits of microorganisms, fibers, and debris, and it may be stringy, pasty, rubbery, tapiocalike, hard, or horny, and it may have a characteristic odor that is different from that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts, and yeast-like organisms.

Besides being objectionable from the standpoint of general cleanliness and sanitation in breweries, wineries, dairies, papermills and other industrial plants or establishments, slime may interfere and produce plugging of screens in pulp and paper systems, thus reducing their efficiency. When large amounts of slime become incorporated in the paper sheet, its strength is reduced, and it may consequently break and require rethreading of the machine. In the paper itself, slime may be responsible for unsightly spots, holes, and odors and may produce general discoloration througout the sheet.

The compounds of this invention are also effective in controlling the growth and proliferation of sulfate-reducing bacteria. This is not only highly desirable but very unexpected because it has been extremely difficult to control the growth of sulfate-reducing bacteria by means of bactericides. In regard to the difficulty heretofore experienced in controlling such bacteria, reference is made to the paper by G. J. Guynes and E. O. Bennett entitled "The Sensitivity of Sulfate-Reducing Bacteria to Anti-Bacterial Agents," published in Producers Monthly, November 1958. These authors studied the effects of 28 organomercurial compounds and 63 phenolic compounds on such bacteria. Of the organomercurial compounds, none inhibited the growth of sulfate-reducing bacteria at concentrations as low as 50 parts per million. This is true despite the fact that organomercurial compounds are generally the most effective and versatile bacteriostatic compounds known. In many cases, these compounds will inhibit the growth of bacteria other than sulfate-reducing bacteria at a concentration of less than 1 part per million. Of the phenolic compounds studied, also known for their general effectiveness, only three reduced the growth of sulfate-reducing bacteria at concentrations as low as 25 parts per million.

When employed in agriculture, the organic thiolsulfonates of our invention are used as seed, plant, and soil bactericides for protecting seeds, seedlings emerging from seeds, and plants against attack by bacteria.

It is, therefore, a principal object of the present invention to provide new and novel organic 2-hydroxyalkyl esters of thiosulfonic acids which obviate the disadvantages of the prior art microbicides.

It is another object of our invention to provide a composition for the control of bacteria in agricultural and industrial process systems.

These and other objects and advantages of the processes and compositions will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by the use of the novel compounds of our invention, which may be defined as 2-hydroxyalkyl esters of thiosulfonic acids having the general formula:

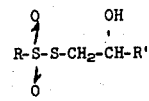

Wherein R is an alkyl group containing 1 to 10 carbon atoms, a substituted alkyl group containing 1 to 10 carbon atoms wherein 1 or more of the hydrogens thereof is replaced by halogen, hydroxyl, alkoxyl, cyano, amino, or nitro group; an aryl group; a substituted aryl group wherein 1 or more of the hydrogens thereof is replaced by halogen, alkoxyl, cyano, hydroxyl, amino, nitro, or lower alkyl; or an aralkyl group; and R' is an alkyl group containing 1 to 8 carbon atoms, chloromethyl, or phenyl.

The 2-hydroxyalkyl esters of thiosulfonic acids may be prepared by several methods, of which the following are examples:

1. An alkali-metal salt of a thiolsulfonic acid is reacted with a 1-halo-2-hydroxyalkane:

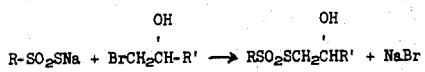

2. A thiolsulfonic acid is reacted with a 1,2-epoxide:

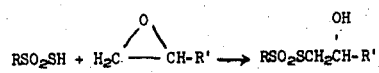

The solvents are used in the above reaction may include water, alcohols, ketones, dimethylformamide, etc. The reactions are usually employed in essentially equal molecular proportions.

Other thiolsulfonates which are effective as bactercides have been described in the chemical and patent literature. Some of these compounds possess some of the properties which are required of industrial microbicides, but the 2-hydroxyalkyl esters of thiosulfonic acids are soluble in water or common inexpensive organic solvents, are stable under ordinary conditions of use and storage, possess sufficiently high vapor pressure so that odors and eye irritations are not a problem and are easily manufactured from readily available materials in good yield.

Boldyrev, et al., (Zh. Org. Khim. 3(1), 37-40-1967) have described the 2-hydroxyethyl esters of several thiolsulfonic acids. These authors state that 2-chloroethyl thiolsulfonates are powerful fungicides, although their antibacterial activity is often lower than that of the chlorinefree alkyl esters. However, the 2-hydroxyethyl esters are reported to have a lower antimicrobial activity, even though the simplest 2-hydroxyethyl alkanethiolsulfonates are still fairly active. No further details are given in the paper. In comparison, we have found that the homolog of 2-hydroxyethyl methanethiolsulfonate, that is, 2-hydroxypropyl methanethiolsulfonate, is actually more effective as a bactericide than 2-chloroethyl ethanethiolsulfonate despite the statements made in the paper referred to above. In addition, a solution containing 35 percent of 2-hydroxyethyl methanethiolsulfonate had an acute oral toxicity ($LD_{50}$) when tested with male and female rats of 355 milligrams per kilogram of body weight.

A similar 35 percent solution of the homologous compound 2-hydroxypropyl methanethiolsulfonate had an acute oral toxicity ($LD_{50}$) of 712 milligrams per kilogram of body weight in male and female rats. The significance of this difference in toxicity is apparent, since the 2-hydroxyethyl methanethiolsulfonate solution would be assigned to Category II by the Pesticides Regulation Division of the United States Department of Agriculture, whereas the 2-hydroxypropyl methanethiolsulfonate solution would be assigned to Category III. Category III products are considered to be significantly less hazardous and would require less stringent caution instructions on labels in accordance with the Federal Insecticide, Fungicide and Rodenticide Act. These facts show that the compound of this invention 2-hydroxypropyl methanethiolsulfonate possesses unexpected and significant advantages over the homologous compound 2-hydroxyethyl methanethiolsulfonate described by Bodyrev et al.

Many of the compounds of our invention are soluble in water or in common organic solvents such as alkyl and aromatic hydrocarbons, alcohols, ketones, esters, ether alcohols, dimethylformamide, dimethylsulfoxide, and other solvents. The addition of a surfactant to the liquid or to the solution renders the less water-soluble compounds of the invention readily dispersible in water. In general, nonionic dispersants are preferred. Examples of such preferred nonionic dispersants include alkylphenoxypolyoxyethylene ethanol or alkylpolyoxyethylene ethanol. It should be understood, however, that suitable dispersants are not so limited.

As to the amount of these compounds which may be added to aqueous systems when used for the control of microorganisms, suitable quantities vary from 0.05 to 1,000 parts per million parts of water. It will be understood, of course, that larger quantities may be used but such larger quantities increase the costs of operation with limited material benefit.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

2-Hydroxypropyl methanethiolsulfonate

A 500ml. reaction flask was charged with 150 milliliters of water, 48.0 grams (0.2 mole) of sodium sulfide nonahydrate and 1.6 grams of sodium hydroxide. The temperature was decreased to 10°–15° C. and 22.8 grams (0.2 mole) of methanesulfonyl chloride was added dropwise. Sulfur precipitated during the addition but redissolved after the reaction was heated at reflux for 1 hour. The reaction mixture was cooled and neutralized with acetic acid and then treated with 12.0 grams (0.2 mole) of additional acetic acid and 17.4 grams (0.3 mole) of propylene oxide at 0° C. The reaction flask was then packed in ice and the contents stirred overnight.

The reaction mixture was then extracted with three 50-ml. portions of methylene chloride and the extract was evaporated on a rotating evaporator. The residue, which contained both solid and liquid, was filtered and the filtrate was dissolved in methylene chloride, washed with 15 milliliters of water and evaporated again. The product was obtained as a yellow liquid and amounted to 15.1 grams (44 percent). The 2-hydroxypropyl methanethiolsulfonate as well as the other 2-hydroxy substituted esters of thiosulfonic acids prepared in Examples 2 to 5 together with those included in Table 1 were characterized by their infrared spectra.

EXAMPLE 2

2-Hydroxybutyl methanethiolsulfonate

A 1,000-ml. reaction flask was charged with 511 milliliters of an aqueous solution containing 0.5 mole of sodium methanethiolsulfonate which had been neutralized with acetic acid and 72.0 grams (1.0 mole) of butylene oxide. The reaction was heated at reflux for 30 minutes, cooled, and extracted with methylene chloride. The extract was dried with anhydrous magnesium sulfate and the solvent was evaporated. The yield of pale green 2-hydroxybutyl methanethiolsulfonate was 50.9 grams (55 percent).

EXAMPLE 3

2-Hydroxy-2-phenylethyl methanethiolsulfonate

The procedure of Example 2 was used to obtain the liquid compound 2-hydroxy-2-phenyl methanethiouslfonate in 43 percent yield from styrene oxide and sodium methanethiolsulfonate.

EXAMPLE 4

3-Chloro-2-hydroxypropyl butanethioluslfonate

A 1,000-ml. reaction flask was charged with 283 grams of an aqueous solution containing 31.1 percent of sodium butanethiolsulfonate (0.5 mole). The solution was treated with 30.0 grams (0.5 mole) of glacial acetic acid added dropwise in 5 to 10 minutes at 25° C. and then with 46.3 grams (0.5 mole) of epichlorohydrin also added dropwise in 5 to 10 minutes at 25°–27° C. The temperature slowly increased to 45°C. and after 2 hours, two layers were present. The reaction was extracted with 100 milliliters of methylene chloride and then with 50 milliliters. The combined extracts were washed with water, dried with anhydrous magnesium sulfate, and the solvent was evaporated. The yield of 3-chloro-2-hyroxypropyl butanethiolsulfonate was 105.6 grams as an amber oil of 83.6 percent purity as determined by thiolsulfonate analysis.

EXAMPLE 5

3-Chloro-2-hydroxypropyl ethanethiolsulfonate

The procedure of Example 4 using sodium ethanethiolsulfonate solution was used to prepare in 65 percent yield product containing 76 percent of 3-chloro-2-hydroxypropyl ethanethiolsulfonate.

The other 2-hydroxy substituted esters of the thiolsulfonic acids included in Example 6 as listed in Table 1 were prepared using the foregoing procedure.

EXAMPLE 6

The 2-hydroxyalkyl esters of thiolsulfonic acids listed in Table 1 were tested by the pulp-substrate method described in U.S. Pat. No. 2,881,070, which disclosure is hereby made a part of this application, using *Aerobacter aerogenes* and pulp substrates that were buffered to pH values of 5.5, 6.5, and 7.5, respectively. The results are tabulated in Table 1.

EXAMPLE 7

The effect of 2-hydroxypropyl methanethiolsulfonate on the growth of the sulfate-reducing bacteria *Desulfovibrio desulfuricans* was determined using the procedure described in Example 1 of U.S. Pat. No. 3,198,733. The results are tabulated in Table 2.

TABLE 1

Percentage kill of *Aerobacter aerogenes* in a pulp substrate at 5.5, 6.5, and 7.5 after 18 hr. contact with the compounds listed below.

| pH | Concentration | 2-Hydroxypropyl luenethiolsulfonate | 2-Hydroxypropyl ethanethiolsulfonate | 2-Hydroxypropyl propanethiolsulfonate | 2-Hydroxypropyl 1-butanethiolsulfonate | 2-Hydroxypropyl benzenethiolsulfonate | 2-Hydroxypropyl methanethiolsulfonate | 2-Hydroxybutyl methanethiolsulfonate | 2-Hydroxy-2-phenyl thanethiolsulfonate | 3-Chloro-2-hydroxypropyl ethanethiolsulfonate | 3-Chloro-2-hydroxy-1-butanethiolsulfonate |
|---|---|---|---|---|---|---|---|---|---|---|---|
|  | ppm |  |  |  |  | Percent kill |  |  |  |  |  |
| 5.5 | 0.1 | 18 | 3 | 0 | 55 | 33 |  |  |  |  |  |
|  | 0.3 | 11 | 13 | 22 | 58 | 0 |  |  |  |  |  |
|  | 0.5 | 0 | 9 | 19 | 71 | 51 | 99.7 | 99.0 | 68 | 0 | 53 |
|  | 1.0 | 0 | 85 | 45 | 65 | 47 | 99 | 99.8 | 99 | 89 | 0 |
|  | 2.0 | 32 | 99.8 | 95 | 78 | 0 | 99.8 | 99.9 | 99.7 | 99 | 53 |
|  | 4.0 | 59 | 99.95 | 99.8 | 99 | 99 | 100 | 99.97 | 99.6 | 99.7 | 48 |
|  | 8.0 | 96 | 99.98 | 99.98 | 99.97 | 99.9 | 100 | 100 | 99.8 | 99.5 | 90 |
|  | 12.0 | 99 | 100 | 100 | 99.97 | 99.96 | 99.99 | 100 | 99.7 | 100 | 97.7 |
|  | 16.0 | 99.6 | 100 | 100 | 99.97 | 100 | 99.97 | 100 | 99.8 | 100 | 99.7 |
| 6.5 | 0.1 | 0 | 0 | 0 | 43 | 17 |  |  |  |  |  |
|  | 0.3 | 0 | 2 | 0 | 23 | 10 |  |  |  |  |  |
|  | 0.5 | 0 | 0 | 0 | 20 | 22 | 99.7 | 99.6 | 30 | 61 | 10 |
|  | 1.0 | 0 | 63 | 0 | 0 | 22 | 99 | 99.8 | 71 | 0 | 32 |
|  | 2.0 | 0 | 99.7 | 93 | 69 | 0 | 99.6 | 99.6 | 79 | 57 | 60 |
|  | 4.0 | 0 | 99.9 | 99.8 | 96 | 28 | 99.98 | 99.99 | 99 | 98 | 58 |
|  | 8.0 | 75 | 99.98 | 99.98 | 99.9 | 98 | 99.99 | 99 | 99.8 | 99.6 | 97 |
|  | 12.0 | 88 | 99.98 | 100 | 100 | 99 | 99.95 | 100 | 99.96 | 100 | 96 |
|  | 16.0 | 99 | 99.98 | 100 | 99.99 | 99.97 | 100 | 100 | 99.9 | 100 | 99.7 |
| 7.5 | 0.1 | 35 | 10 | 4 | 12 | 6 |  |  |  |  |  |
|  | 0.3 | 18 | 38 | 24 | 6 | 17 |  |  |  |  |  |
|  | 0.5 | 23 | 0 | 11 | 28 | 27 | 80 | 0 | 70 | 0 | 0 |
|  | 1.0 | 33 | 56 | 0 | 34 | 47 | 96 | 97 | 69 | 31 | 7 |
|  | 2.0 | 7 | 40 | 14 | 70 | 48 | 96 | 99 | 74 | 40 | 0 |
|  | 4.0 | 6 | 70 | 48 | 74 | 63 | 99 | 98 | 99 | 24 | 0 |
|  | 8.0 | 16 | 99.6 | 97 | 97 | 75 | 99.5 | 99.8 | 99.8 | 88 | 2 |
|  | 12.0 | 33 | 99.9 | 99 | 98 | 80 | 99.8 | 99.9 | 99.7 | 99.95 | 0 |
|  | 16.0 | 33 | 100 | 99.9 | 99.6 | 95 | 99.8 | 100 | 100 | 99.9 | 72 |

TABLE 2

Inhibition of *Desulfovibrio desulfuricans*.

| Concentration P.p.m. | Growth of *Desulfovibrio desulfuricans* in duplicate tests |
|---|---|
| 0 | + + |
| 1 | + + |
| 3 | + + |
| 5 | + + |
| 7 | + + |
| 10 | 0 + |
| 15 | 0 0 |
| 25 | 0 0 |

\+ = intense blackening of the medium
0 = medium remained clear

Particularly for agricultural application, the organic compounds of this invention may be used diluted with a carrier which may be liquid or solid. Dusts may be prepared with a finely divided solid such as talc, clay, pyrophylite, diatomaceous earth, hydrated silica, calcium silicate, or magnesium carbonate. If desired, wetting an/or dispersing agents may be used. When the proportions of these are increased, there results a wettable powder, which may be dispersed in water and applied from a spray.

Dusts may contain 1 percent to 15 percent of one or more compounds of this invention, while wettable powders may contain up to 50 percent or more of one or more of these compounds.

A typical formulation of a wettable powder comprises 20 percent to 50 percent of the organic compounds, 45 percent to 75 percent of one or more finely divided solids, 1 percent to 5 percent of a wetting agent, and 1 percent to 5 percent of a dispersing agent. Typical wetting agents include sodium dodecyl sulfate, sodium nonylbenzene sulfonate, sodium dioctyl sulfosuccinate, octylphenoxypolyethoxyethanol, or other nonionic agents, such as ethylene and/or propylene oxide condensates with long chained alcohols, mercaptans, amines, or carboxylic acids. Typical dispersing agents include the sodium sulfonate of naphthalene-formaldehyde condensates and lignin sulfonates.

Liquid concentrates may also be used. For compounds of this invention which are solids, the concentration may be prepared by taking up the organic compounds in an organic solvent together with one or more surface active agents. For example, there may be mixed 60 parts of one of the organic compounds, 10 parts of a surface-active solvent-soluble alkylphenoxypolyethoxyethanol and 30 parts of aromatic mineral spirits or xylene.

The compounds of this invention may be used in conjunction with other fungicidal agents and also in conjunction with miticides or insecticides or other pesticides.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of preparing a compound of the formula:

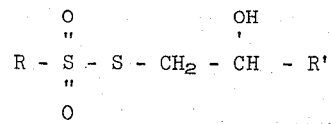

wherein R is an alkyl group containing 1 to 4 carbon atoms or a substituted alkyl group containing 1 to 4 carbon atoms wherein one or more of the hydrogens thereof is replaced by a hydroxyl group, and R' is an alkyl group containing 1 to 2 carbon atoms which comprises reacting an alkali-metal salt of a thiolsulfonic acid in the presence of an organic acid with an 1,2-epoxide having the formula

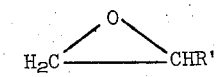

wherein R' is as previously identified and where said salt and said epoxide are used in approximately equal molecular proportions at a temperature varying from 0° to reflux temperature for a period of from 0.5 to 24 hours.

2. The method of claim 1 wherein an alkali-metal salt of an alkanethiolsulfonic acid is reacted with propylene oxide or butylene oxide in the presence of acetic acid.

3. The method of claim 1 wherein R and R' are methyl.

4. The method of claim 1 wherein R is methyl and R' is ethyl.

* * * * *